United States Patent Office

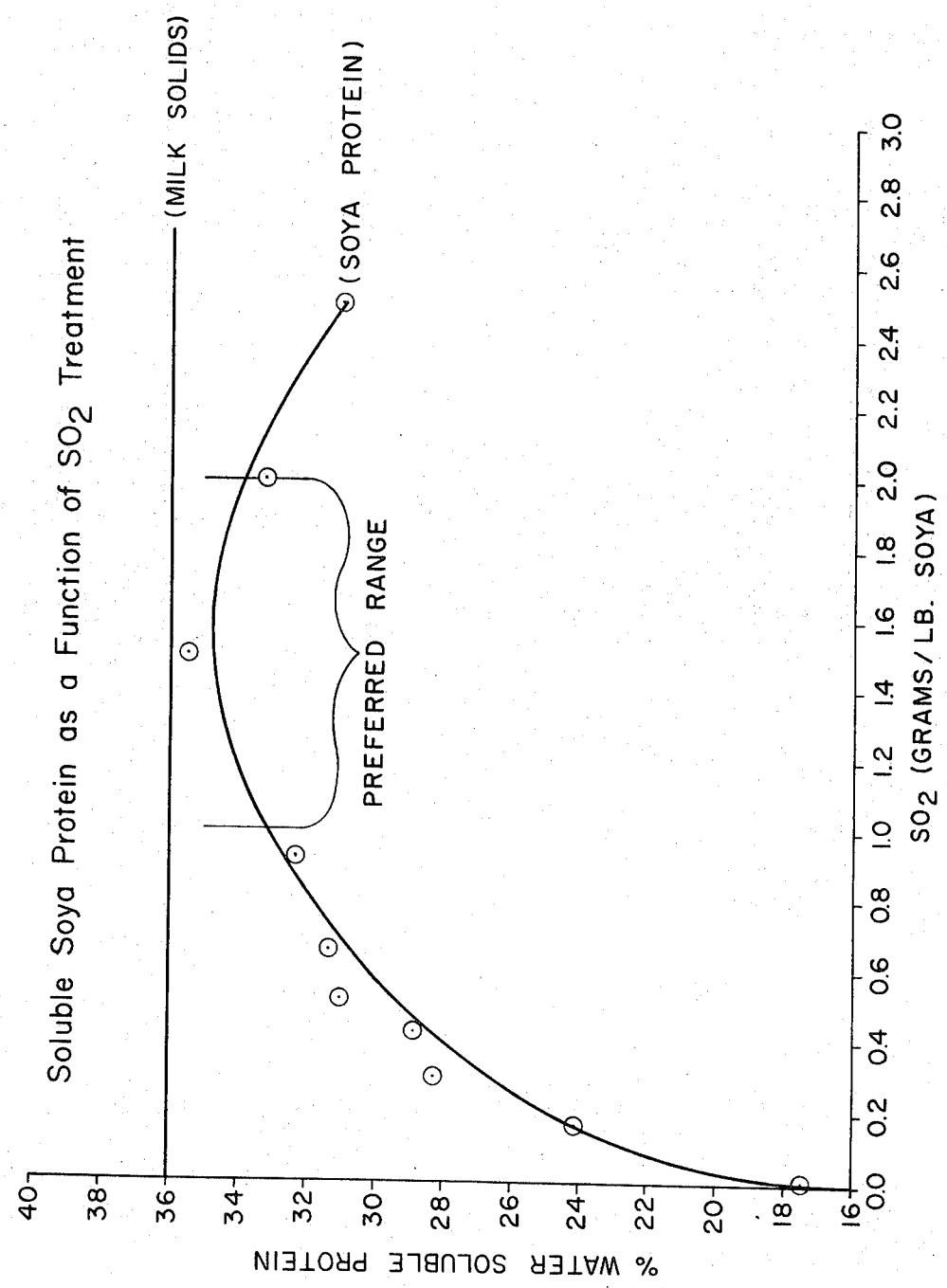

3,542,562
Patented Nov. 24, 1970

3,542,562
MAKING SOYA FLOUR FUNCTIONAL IN PREPARED CULINARY MIXES
Robert R. Cooke, Evendale Village, John E. Hunter, Springfield Township, Hamilton County, and Robert W. Mitchell, Cincinnati, Ohio, assignors to The Procter & Gamble Company, Cincinnati, Ohio, a corporation of Ohio
Filed Dec. 21, 1967, Ser. No. 692,342
Int. Cl. A21d 2/28
U.S. Cl. 99—94                        5 Claims

ABSTRACT OF THE DISCLOSURE

Soya flour is treated with an optimum amount of $SO_2$ gas in order to solubilize it so that it can serve as a protein source in prepared culinary mixes.

BACKGROUND

Nearly all prepared culinary mixes use milk solids as a major protein source. The milk solid protein is employed in culinary mixes principally to enhance the structural qualities of the mix. Culinary mixes lacking a protein builder tend to collapse and crumble when cooked. Usually the milk solids are obtained from non-fat dry milk. Despite a rather high cost, those skilled in the art of preparing culinary mixes have continued to use milk solids as a protein source principally because of the high solubility levels of milk solid protein.

Milk solids are about 36% protein and nearly all of this protein is water-soluble. Thus milk solids, because of the ease of their protein solubility are highly useful in prepared culinary mixes. If the solubility level of a protein material is much lower than that of milk solids, its usefulness in prepared culinary mixes, at the usual batter pH of 6.5–7.0, is poor and the protein sorce is not satisfactory to use in preparing culinary mixes. Alternative and/or less expensive sources of protein for prepared culinary mixes are desired.

It has been known for many years that soya flour is a relatively inexpensive source of protein; however, soya flour has not been used as a milk solid protein substitute in prepared culinary mixes principally because of the low solubility levels of soya flour protein. In fact the solubility levels are so low that soya flour per se is not useful as a protein source for prepared culinary mixes.

SUMMARY

This invention relates to a process for increasing water solubility of soya flour. This invention also relates to dry prepared culinary mixes containing flour and this specially treated soya flour as a protein source. Baking batters are prepared from these dry materials by the addition of appropriate dry and liquid substances. It has been found that by exposing soya flour to $SO_2$ for a period of time, the soya flour becomes appreciably more water soluble. Solubility of soya flour so treated can be increased to a point of substantially equalling that of milk solids in prepared culinary mixes.

More specifically, the process of treating soya flour of this invention involves:

(a) providing a moisture content of the soya flour of from about 5% to about 20% by weight of soya flour; and (b) treating, at temperatures of from about 60° F. to about 150° F., the moisturized soya flour of step (a) with from about 0.5 grams to about 4.0 of $SO_2$ per pound of soya flour.

DRAWING

The accompanying drawing is a graphical representation of the soluble soya protein as a function of the $SO_2$ treatment. The drawing shows in graphical form that as the amount of $SO_2$ used approaches the preferred range the soya protein solubility approaches the solubility levels of milk solid proteins.

DETAIL DESCRIPTION

This invention comprises a dry prepared culinary mix containing flour and a soluble protein, the protein being obtained from soya flour which has been treated with $SO_2$ gas at temperatures ranging from 60° F. to about 150° F. for a period of time ranging from about 5 minutes to several hours. As used herein the term prepared culinary mix means a mix suitable for the preparation of edible products which contains flour and specifically treated soya flour as the protein source. Besides the basic flour and treated soya flour ingredients the mix may also contain other well-known ingredients such as sugar, shortening, leavening agents, stabilizers and so on. The ultimate culinary mix composition can be varied according to well-known procedures to produce various known products such as mixes for yellow cakes, white cakes, chocolate cakes, angel food cakes, pancake batters, biscuit mixes, and so on.

The soya flour which is used as a starting material in the process of the invention is an available material and can be obtained from any of the well-known commercial suppliers. Briefly, it is prepared by grinding soybeans into a meal-like substance and then extracting the fatty oils with an appropriate solvent such as hexane. The residue is largely carbohydrate and protein material. The resulting residue is run through a heating and steaming process to remove any remaining traces of hexane. The temperature during this heating and steaming process is from about 230° F. to about 260° F. This is continued for from about one-half to about one hour.

Prior to the $SO_2$ treatment of this invention, the soya flour starting material obtained as noted above, is preferably pulverized or ground into a finely divided form, preferably to a particle size that will pass through a 100 mesh U.S. standard screen. The pulverizing or grinding step can be accomplished by use of a hammer mill, a ball mill, a pebble mill, a tumbling mill, or any other conventional grinder. The ground soya flour is then placed in a conventional blender. Any blender is suitable, for example, a double cone blender gives satisfactory performance. The blender should be of such a nature that it can be freely agitated and preferably have some means of allowing injection of gaseous substances Prior to the $SO_2$ treatment and while the soya flour is preferably being continuously agitated, steam is injected in order to increase the moisture content of the flour to from 5% to about 20% by weight of soya flour but preferably within the range of 6 to 12% by weight of soya flour. Having a moisture content of from about 5% to about 20% by weight of soya flour is necessary to obtain the resulting (after the $SO_2$ treatment) increase in protein solubility. If less than 5% by weight of moisture is present in the soya flour, the $SO_2$ treatment will not increase the solubility to levels comparable to that of milk solids; on the other hand, if over 20% by weight of soya flour of moisture was added, undesirable side reactions are increased. While satisfactory results in solubilization can be obtained at all moisture levels between 5% and 20% by weight of soya flour, optimum results can be achieved when the moisture level is between 6% and 12% by weight of soya flour.

Table I shown below shows the effect of varying the moisture content of the soya flour prior to the $SO_2$ treatment. The process used was in accord with that described in detail below. In all runs the temperature of the $SO_2$ treatment was 78° F.; the time of treatment was ten minutes. Compressed $SO_2$ gas was employed. The percents as shown in Table I are all weight percents. As can be seen from Table I, all else being constant, a change in the moisture level prior to the $SO_2$ treatment significantly effected the amount of water soluble soya protein obtained after the $SO_2$ treatment. Generally, the lower levels of moisture content resulted in higher percentages of water soluble protein. The percent of water soluble protein was calculated by the well known Kjeldahl nitrogen determination. For a detailed explanation of the Kjeldahl determination see Kolthoff & Sandell, Textbook of Quantitative Inorganic Analysis (3rd ed.) at page 535, which is incorporated herein by reference. For the soya flour determination the protein conversion factor, referred to page 538 of the text, was 6.25.

TABLE I.—WATER SOLUBLE PROTEIN AS A FUNCTION OF MOISTURE CONTENT

| | $SO_2$, gm./ lb. of soya flour | Percent water soluble protein | |
|---|---|---|---|
| | | Run I | Run II |
| Moisture content, percent: | | | |
| 7 | 1.5 | 35.1 | 35.6 |
| 7 | 2.0 | 33.4 | 33.1 |
| 7 | 2.5 | 30.6 | 32.4 |
| 11 | 1.5 | 33.4 | 32.2 |
| 11 | 2.0 | 28.7 | 29.1 |
| 11 | 2.5 | 26.9 | 28.4 |
| 13 | 1.5 | 32.2 | 32.0 |
| 13 | 2.0 | 31.0 | 29.7 |
| 13 | 2.5 | 28.2 | 26.1 |

During the process as herein described the temperature should be kept within the range of about 60° F. to about 150° F. and preferably within the range of about 60° F. to about 120° F. Maintaining the temperature within the range of from 60° F. to 150° F. during the addition of the $SO_2$ gas is important for at least two reasons. First if the temperature is much below about 60° F., the kinetics of the reaction are such that it will proceed very slowly. Secondly, high temperatures (over 150° F.) cause a competing reaction which renders the protein insoluble in water and thus unsatisfactory for use in culinary mixes. While not wanting to be bound by any theory, it is possible that the competing reaction at higher temperatures is a protein heat denaturizing reaction in which the protein is placed in such a structural form that its use in a culinary mix is not satisfactory. At temperatures much above 120° F. this decrease in soluble protein commences and at temperature exceeding 150° F. it is especially apparent.

While maintaining the temperature within the above referred to 60° F. to 150° F. range, $SO_2$ gas is passed into the reaction system, preferably while continuously stirring or agitating so that the $SO_2$ will be exposed to all of the flour in the reaction vessel. The source of the $SO_2$ gas used in this process may be any of the sources well known to one skilled in the art. For example, the gas may be produced by a number of well known chemical reactions and then allowed to enter the vessel containing the soya flour; however, because of ease of handling and over all process efficiency it is prefered to use any one of the commercially available compressed $SO_2$ gas cylinders. These allow for a quick and convenient method of bringing the $SO_2$ and soya flour into contact. The amount of $SO_2$ added should be from 0.5 grams/lb. of soya flour to about 4.0 grams/lb. of soya flour; however, the optimum amount is between 1.0 and 2.0 grams of $SO_2$/lb. of soya flour. When 1.0 to about 2.0 grams of $SO_2$/lb. of soya flour is added to the reaction mixture the resulting percent of water soluble protein is from about 34% to 35% or more which is at a level comparable to that of milk solids. In looking at the drawing which expresses water soluble soya protein as a function of the amount of $SO_2$ used (at a constant moisture level of 7%) it can readily be seen that using between 1.0 and 2.0 grams of $SO_2$/lb. of soya flour will give the highest percentage of water soluble soya protein. Within this range, the amount of soluble protein is nearest the parallel line designated "milk solids" which represents the most desirable level of solubility of protein in culinary mixes. As shown by the line labeled "soya protein" if much beyond 4.0 grams/b. of soya is used, the soya protein solubility will diminish until it is not much better than soya flour.

The soya flour is subjected to the $SO_2$ treatment for from about 5 minutes to about 20 minutes. Five minutes is about the minimum amount of time at which the increased solubility effect becomes significant and after about 20 minutes there is no appreciable increase in protein solubility. Thus the $SO_2$ and soya flour may continue in contact for several hours without any significant adverse effect, however, there is no real need to extend the time of contact beyond the twenty minute level as to do so would merely increase the amount of expended time without a corresponding increase in performance.

As noted above, the preferred source of $SO_2$ is any one of the commercially available compressed $SO_2$ gas cylinders. When using the compressed gas cylinders, the amount of $SO_2$ gas added to the soya flour containing vessel may be controlled and/or calculated by many well known analytical techniques. One of the simplest is by controlling the flow rate of the $SO_2$ gas. For instance the valve can be opened to an experimentally designated position so that a designated number of grams of $SO_2$ wil be released per minute. While any convenient flow rate may be used, a rate of 1.3 grams/minute was found desirable from the standpoint of time efficiency. Another means of determining the amount of $SO_2$ gas added to the soya flour is by the method of weight loss of the gas cylinder. The cylinder is weighed before the addition of $SO_2$ and then reweighed at intermittent times until the weight loss corresponds with the amount of $SO_2$ needed for the reaction.

The physicochemical change which occurs in soya flour when it is treated by the process of this invention and is thus solubilized for use in prepared culinary mixes is not well understood. While not wishing to be bound by any particular theory, it is believed that the $SO_2$ treatment disclosed herein allows the protein polymer molecule to disaggregate which in turn increases its solubility. The term "disaggregate" as used herein refers to decreasing the number of linkages binding individual molecules to each other.

More specifically, it is well known in the art of protein chemistry that protein polymers consist of amino acids linked together by a peptide linkage which may continue to repeat itself to form a large polymer molecule represented as follows:

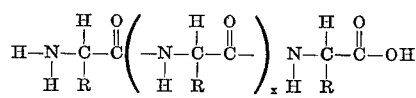

wherein X represents the number of repeating protein units and R is an abbreviated method of representing the structure, other than the peptide linkage, of any amino acid. However, if cystine, an amino acid containing sulfur and having the formula:

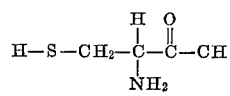

is present the sulphydryl group (—SH) may combine with another such group to form an interlocked crosslink polypeptide chain as indicated schematically by the structure:

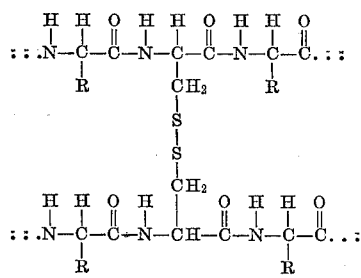

This cross linking and inter-molecular bonding may continue as long as cysteine amino acid groups are close enough to allow the reaction to take place. The inter-molecular bonding contributes to protein aggregation. If the protein aggregate then becomes denatured the protein becomes insoluble and loses its usefulness in prepared culinary mixes. By treating the protein with $SO_2$, the disulfide cross linkages are believed to be reduced to (—SH—) or (—S—$SO_3$) groups and thereby allow the protein aggregate to disassociate and become more nearly individual molecules, which may in turn expose new hydrophilic groups. In any event, this treatment renders soya flour suitable for use in dry, prepared culinary mixes from which products such as layer cakes, among others, can be prepared.

Prepared culinary mixes suitable for the practice of this invention can contain sugar and shortening as well as flour and the specially treated soya flour. Additional ingredients such as hydrophilic colloids, leavening and flavoring are added to provide the specific type of product desired. All types of prepared culinary mix compositions which currently use non-fat dry milk solids as a protein source can be made with the $SO_2$ treated soya flour of this invention, for example, white cakes, yellow cakes, chocolate cakes, devils food cakes, marble cakes, spice cakes, high ratio as well as low ratio cakes, and many other types of prepared culinary mixes such as angel food mixes, pancake mixes, cookie mixes, muffin mixes, and so on; however, for purposes of illustration, a specific application of this invention to layer cake mixes, which are preferred, will be set forth in detail.

Suitable sugars include any of the commonly used granular sugars such as sucrose, dextrose, maltose, fructose, lactose and brown and invert sugars. The sugar can also be in powder form and mixtures of more than one type of sugar can be use.

The flour can be the usual bleached cake flour although a good general purpose flour can be substituted for such cake flour especially if appropriate emulsifiers are provided in the shortening. The ratio of sugar to flour can be adjusted as necessary for special circumstances but a ratio of sugar to flour in excess of 1:1 has long been known to result in particularly good cake mixes which are often referred to as "high-ratio" cakes. Cake mixes in which the ratio of sugar to flour is less than 1:1 are generally referred to as "low-ratio" and can also utilize the specially processed soya flour of this invention.

The shortenings which can be employed in the culinary mix systems of this invention include solid or plastic as well as liquid or semi-liquid glyceride shortening derived from animal, vegetable or marine fats and oils including synthetically prepared shortenings. These glycerides con contain saturated or unsaturated "long-chain" acryl radicals having from about 12 to about 22 carbon atoms such as lauroyl, lauroyleoyl, myristoyl, myristoleoyl, palmitoleoyl, stearoyl, oleoyl, linoleoyl, arachidoyl, arachidenoyl, behenoyl, erucoyl and the like and are generally obtained from edible oils and fats such as cottonseed oils, soybean oil, coconut oil, rapeseed oil, peanut oil, olive oil, palm oil, palm kernel oils, sunflower seed oil, wallflower oil, pilchard oil, lard, tallow and the like. These glycerides can also contain in part one or two short-chain acryl groups having from 2 to about 6 carbon atoms such as acetyl, propanoyl, butanoyl, valeryl, and capropyl; they can be prepared by random or low-temperature interesterification reactions of fatty triglyceride-containing oils and fats such as interesterified or rearranged cottonseed oil and lard; and they can be otherwise formed by various organic syntheses.

The shortening can be of the so-called emulsified variety, containing up to 50%, and more normally about 5-25%, by weight of one or more suitable emulsifiers. The partially esterified polyhydric compounds having surface active properties are an example of appropriate emulsifiers. This class of emulsifiers includes, among others, mono- and diglycerides, e.g., of soybean oil or rapeseed oil, fatty acid esters of glycols, such as propylene glycol monosteareate and monobehenate; higher fatty acid esters of sugars, such as the partial palmitic and oleic esters of sucrose, phosphate or sulfate esters such as dodecryl glyceryl ether sulfate and monostearin phosphate. Other examples are the partial esters of hydroxy carboxylic acids, such as lactic, citric, and tartaric acids, with polyhydric compounds, for example, glyceryl lactopalmitate, and the polyexyethylene ethers of fatty esters of polyhydric alcohols, such as polyoxytheylene ether of sorbitan monostearate or distearate. Fatty acids alone or esterified with a hydroxy carboxylic acid, e.g., stearyl-2-lactylate, are also useful.

The emulsifier can be any one or a combination of the various alpha phase crystal tending emulsifiers disclosed in U.S. Pats. 3,145,108 and 3,145,109 issued to Howard on Aug. 18, 1964 and in U.S. Pat. 3,145,110 issued to Abbott on Aug. 18, 1964. Examples of preferred alpha phase crystal tending emulsifiers are propylene glycol monostearate, acetylated mono- or di-glycerides, and lactylated mono- or di-glycerides, e.g., of soybean oil.

Another ingredient which is preferably used in conjunction with the shortening of these mixes is a high temperature batter stabilizer such as stearic acid, malic stearate, and octadecyl hydrogen succinate or any of the high temperature batter stabilizers which are disclosed in U.S. Pats. 3,145,108, 3,145,109, 3,145,110 and are also disclosed in U.S. Pat. 3,168,405 issued to Howard and Martin on Feb. 5, 1965. The high temperature batter stabilizer is preferably used in an amount of from about 0.25 to about 4.0% by weight of the shortening.

The selection of a chemical leavening system from among those known in the art poses no problem for one skilled in the formulation of culinary mixes. In general such systems are composed of baking soda, e.g., sodium, potassium, or ammonium bicarbonate, on the one hand, and one or more phosphates or other common baking acids on the other. Suitable baking acids include monocalcium phosphate, dicalcium phosphate, sodium acid pyrophosphate, potassium acid tartrate, monosodium phosphate, sodium aluminum phosphate, among others. The amount of soda and the selected acid are also so balanced as to achieve a pH in the resultant batter of about 6 to 10. Frequently, provision of a slight excess of soda is advantageous so as to assure absence of unreacted acid/or to compensate for the acid tendency of some batter ingredients.

For many mixes it is accepted practice for the consumer to add the required amount of eggs in the course of batter preparation and this practice can be followed just as well in the present mixes. If desired, the inclusion of egg solids in the mix is an allowable alternative. The function and permissible variations in the remaining ingredients, for example, flavor, color, dry milk solids, or the like, are sufficiently apparent to render the detailed explanation thereof unnecessary.

As noted above, it is to be understood that a wide variety of culinary compositions and especially cakes can be prepared from mixes which contain the above named ingredients; however, for exemplary purposes a specific application of this invention to layer cake mixes which are preferred is set forth. The composition of the mixes of this invention which are suitable for baking layer cakes can vary but representative compositions are within the following ranges:

| Ingredient: | Percent by wt. of dry mix |
|---|---|
| Bleached cake flour | 20–50 |
| Soya flour processed according to the invention | 1.0–5 |
| Sugar | 20–70 |
| Shortening | 4–26 |
| Leavening agents | 0–4 |
| Egg solids | 0–5 |
| Hydrophilic colloids | 0–1 |
| Non-fat dried milk solids | 0–5 |
| Cocoa | 0–10 |
| Flavoring (including spices) | 0–10 |
| Coloring, minor amounts. | |

It should be noted that the above representative layer cake composition has included from about 1% to about 5% by weight of specially treated soya flour and also from 0–5% by weight of non-fat dry milk solids. This is so because the specially treated soya flour need not completely replace the milk solids as a protein source. While the treated soya flour can act as a useful replacement for the entire amount of milk solids, in some situations, depending upon the specific qualities desired in the culinary mix, it is advantageous to employ some milk solids. In short, all or any part of the milk solids may be replaced by the specially treated soya flour.

The exact method of compounding the dry mixes of this invention is not critical. Very satisfactory results are obtained by blending the flour, sugar, and shortening into a homogeneous premix in a ribbon blender.

This premix can be passed through an impact grinder to eliminate any lumps which may be formed. Additional ingredients can then be added and the whole mixture of ingredients again mixed. An additional step of impact grinding may be desirable to remove any lumps present in the final dry mix.

Another method of preparing the dry mix is by the method disclosed in U.S. Pats. 2,874,051 issued to Bedenk et al., 2,874,052 issued to Bedenk, and in 2,874,053 issued to Mills on Feb. 14, 1959 in which a homogeneous blend is formed containing sugar, flour and shortening, and this blend is then subjected to simultaneous shearing and crushing forces, e.g., in a roll mill.

The manner in which the essential ingredient of the invention, i.e., the $SO_2$ treated soya flour, is added to the composition is not critical, so long as it is mixed with the other compounds. Thus, the $SO_2$ treated soya flour can be added to a sugar-flour-shortening premix during the blending thereof and prior to milling. Equally satisfactory is the addition of the $SO_2$ treated soya flour to the other components before the addition thereof to the sugar, flour and shortening.

The following examples describe with particularity several of the preferred embodiments of the invention described hereinbefore. It will be obvious to those skilled in the art that the invention can be performed in numerous other ways. These examples are given by way of additional illustration and not by way of limitation.

In preparing and evaluating the cakes prepared as hereinafter described a standard white cake formulation was used as a control. It was used as the control not only because of its excellent cake qualities but also because it has one of the highest milk solid contents, 4.7% by weight, of any cake. Thus when soya flour is solubilized so as to be a protein substitute for milk solid in a cake ordinarily using high milk solid content, it is apparent that it can be used in other cakes ordinarily having lesser amounts of milk solids, for example, chocolate cakes, yellow cakes, marble cakes and many other layer cakes. The white cake formulation used as a control had the following composition: (The percents and parts are given by weight unless otherwise specified.)

WHITE CAKE FORMULATION

| Ingredients: | Percent |
|---|---|
| Sugar | 44.00 |
| Flour | 38.00 |
| Shortening (vegetable oil base containing 13% emulsifier comprising lactylated soybean monoglyceride and rapeseed monoglyceride) | 11.00 |
| Leavening (sodium bicarbonate and sodium aluminum phosphate) | 2.15 |
| Flavor | 0.15 |
| Milk solids | 4.70 |

In the data table, shown below as Table II, this cake is referred to as "control" and represents a very desirable cake. It is shown for comparison purposes.

Test cakes baked with the soya flour had the following basic formulation, with the shortening and leavening being the same as in the white cake above:

TEST CAKE FORMULATION I

| Ingredients: | Percent |
|---|---|
| Sugar | 44.00 |
| Flour | 38.00 |
| Shortening | 11.00 |
| Leavening | 2.15 |
| Flavor | 0.15 |
| Soya flour | 4.70 |

The only variation in these test cake formulations was whether or not the soya flour was treated with $SO_2$, the amount of $SO_2$ used if it was treated, and the amount of moisture content in the soya flour at the time of each treatment.

All of the cakes including both the control cake and the test cakes were baked in the following manner: 238 parts of sugar, 205 parts of flour and 60 parts of shortening were thoroughly blended in a conventional mixer and then passed through a standard roll mill; after the milling step 11.6 parts of leavening was added, 0.81 parts of flavoring was added and 25.4 parts of milk solids, soya flour, or treated soya flour was added, the mixture was then subjected to impact grinding to break up any large particles. The dry ingredients were then mixed for about one minute, at low speed, in an ordinary home mixer. 3000 gram batches of mix were prepared in this manner. For each cake, 320 grams of water and 60 grams of egg whites were then added to 540 grams of mix and the resulting mixture was mixed in a home mixer for about 3 minutes at a medium speed; the batter was poured into an 8-inch round aluminum pan and baked for about 27 minutes at 350° F.

EXAMPLE I

A cake having the above referred to test cake formulation I was prepared in the manner above described. The soya flour was, before addition into the culinary mix, in a ground condition such that it passed through a 100 mesh U.S. Standard screen, and then treated as hereinafter described. The soya flour was placed in a double cone blender and continuously agitated. Steam was injected into the blender until the moisture content of the soya flour was 7% by weight of soya flour. 0.5 grams of $SO_2$/lb. of soya flour was thereafter added and the temperature was kept at about 78° F. (room temperature). The mixture was allowed to stay in contact for a period of 20 minutes. The treated soya flour was used in baking a test cake in the manner described above and is referred to in Table II as Cake I.

EXAMPLE II

A cake having the above referred to test cake formulation I was prepared in the manner described above. Before incorporation in the culinary mix the soya flour was treated as described in Example I except for the following change: 1.14 grams of $SO_2$/lb. of soya flour was used. The treated soya flour was used in baking a test cake in the manner describer above and is referred to in Table II as Cake 2.

EXAMPLE III

A cake having the above referred to test cake formulation I was prepared in the manner described above. Before incorporation in the culinary mix the soya flour was treated as described in Example I except for the following change: 1.33 grams of $SO_2$/lb. of soya was used. The treated soya flour was used in baking a test cake in the manner described above and is referred to in Table II as Cake 3.

EXAMPLE IV

A cake having the above referred to test cake formulation I was prepared in the manner described above. Before incorporation in the culinary mix the soya flour was treated as described in Example I except for the following changes: 1.5 grams of $SO_2$/lb. of soya flour was used and the moisture content of the flour was 11% by weight. The treated soya flour was used in baking a test cake in the manner described above and is referred to in Table II as Cake 4.

EXAMPLE V

A cake having the above referred to test cake formulation I was prepared in the manner described above. Before incorporation in the culinary mix the soya flour was treated as described in Example I except for the following changes: 2.0 grams of $SO_2$/lb. of soya flour was used and the moisture content of the flour was 7% by weight. The treated soya flour was used in baking a test cake referred to in Table II as Cake 5.

EXAMPLE VI

A cake having the above referred to test cake formulation I was prepared in the manner described above. Before incorporation in the culinary mix the soya flour was treated as described in Example I except for the following changes: 1.5 grams of $SO_2$/lb. of soya flour used and the moisture content was 13% by weight. The treated soya flour was used in baking a test cake in the manner described above and is referred to in Table II as Cake 6.

EXAMPLE VII

A cake having the above referred to test cake formulation I was prepared in the manner above described. Before incorporation in the culinary mix the soya flour was treated as described in Example I except for the following changes: 2.5 grams of $SO_2$/lb. of soya was used and the moisture content of the flour was 13% by weight. While this example, as well as the others, have been described with particular reference to providing the soya flour moisture content by means of steam injection, equally satisfactory results can be achieved by spraying, using a humidifying zone or any other well-known means of providing moisture content.

In addition to the above examples "Product 8" was prepared by incorporating the untreated soya flour in the test cake formulation. It is offered for comparison purposes only and demonstrates the significant difference obtained when the process of treating soya flour of this invention is employed.

Tests

In evaluating the cakes prepared in accordance with the above outlined procedures use was made of the following testing procedures:

*Cake center height.*—This is a measure of the height of the cake as determined by measuring at approximately the center of the cake. It is determined by placing a measuring probe in a perpendicular manner through the cake until it touches the bottom of the pan. A sliding scale is then moved down until it touches the surface of the cake and the height is recorded in inches. The closer the reading is to the control cake height, the more desirable is the culinary mix. In the table shown below DHT refers to the difference between the control cake height and the test cake height. The center height was measured directly after the cake was removed from the oven.

*Cake physical quality.*—This is a test of the physical quality of a cake as determined by selected knowledgeable experts. Among other things, the panel considers whether the cake is crumbly, whether it has a pleasing feel on the palate, whether the cake is gummy—e.g., spreads out and clings to the mouth and teeth, whether the cake is pasty—i.e., makes a doughy ball in the mouth, and also the moistness of the cake. For example, a very dry cake will act as a dessicant and tend to draw moisture away from the palate; on the other hand a moist cake will have no such effect. The control cake was arbitrarily given a rating of 10 and the test cakes were rated accordingly. 5.0 is the poorest possible rating.

TABLE II.—TEST CAKE DATA TABLE
[Using Formulation I]

| | Center ht., inches | DHT, inches | Cake physical quality |
|---|---|---|---|
| Cake: | | | |
| Control | 2.14 | 0 | 10 |
| 1 | 2.01 | −.13 | 6.5 |
| 2 | 2.06 | −.08 | 7.5 |
| 3 | 2.10 | −.04 | 7.3 |
| 4 | 2.04 | −.10 | 8.5 |
| 5 | 2.07 | −.07 | 7.0 |
| 6 | 2.10 | −.04 | 8.5 |
| 7 | 2.00 | −.14 | 7.5 |
| Product 8 | 2.04 | −0.10 | 5.0 |

As can be seen from Table II, only those cakes containing the $SO_2$ treated soya meal approached the control cake in overall physical cake quality. Product 8 using the untreated soya flour was given the lowest possible rating (5.0) whereas some of the test cakes using the treated soya protein received ratings of 8.0 or higher. Moreover the table also shows that little difference in cake height was shown when the control cake was compared with the test cakes.

The formulation of Cake 6 as shown in Table II and as prepared in Example VI was modified by changing the percent of treated soya flour in the cake formulation. As the amount of soya flour protein was decreased from the 4.70% by weight as shown in "Test Cake Formulation I," the amount of flour used was increased by a corresponding amount. The amounts of the other ingredients were the same as that shown in "Test Cake Formulation I."

Five cakes, A, B, C, D and E, were prepared in accord with the directions of Example VI. The soya protein level, shown in Table III, varied from 0.93% by weight to 5.56% by weight. The control cake contained 4.7% by weight of milk solids. Table III shows the results of subjecting cakes A, B, C, D and E to the Cake Center Height and Cake Physical Quality tests.

TABLE III.—TEST CAKE DATA TABLE

| | Soya level, wt. percent | Center ht., inches | DHT, inches | Cake physical quality |
|---|---|---|---|---|
| Cake: | | | | |
| Control | 4.7 | 2.22 | 0 | 10 |
| A | 0.93 | 2.21 | −.01 | 9.0 |
| B | 1.85 | 2.24 | +.02 | 9.5 |
| C | 2.78 | 2.20 | −.02 | 9.5 |
| D | 3.70 | 2.17 | −.05 | 9.5 |
| E | 5.56 | 2.12 | −.10 | 8.0 |

As can be seen from Table III, by varying the level of soya protein, to levels below that of the 4.7% level as shown in the white cake formulation above, Cake Physical Quality more closely approaches that of the Control Cake. This is significant because as previously mentioned very few cakes or other culinary mixes have as high a level of milk solids content as does the white cake formulation; thus in all of those cakes having slightly lesser amounts of milk solids, soya flour can be used as a milk solid substitute without any noticeable decrease in cake Physical Quality.

What is claimed is:

1. A process for increasing the solubility of soya flour which comprises:
   (A) providing a moisture content of the soya flour of from about 5% to about 20% by weight of soya flour; and
   (B) treating, at temperatures of from about 60° F. to about 150° F. for at least 5 minutes, the moisturized soya flour of step (A) with from about 0.5 grams to about 4.0 grams of $SO_2$ per pound of soya flour.

2. The solubilized soya flour produced by the process of claim 1.

3. The process of claim 1 wherein the moisturized soya flour is treated with sulfur dioxide for from 5 minutes to 20 minutes.

4. The process of claim 3 wherein the moisture content of said soya flour is from about 6% to about 12% by weight of soya flour, and the amount of sulfur dioxide used is from about 1.0 to about 2.0 grams per pound of soya flour, and the temperature is from 60° F. to about 120° F.

5. A dry, prepared layer cake mix containing sugar, flour, and shortening and the soya flour of claim 2, said soya flour comprising from about 1.0% to about 5.0% by total weight percent of said cake mix.

References Cited
UNITED STATES PATENTS 2,113,570    4/1938    Bauer _____ 99—93

RAYMOND N. JONES, Primary Examiner

U.S. Cl. X.R.

99—99